UNITED STATES PATENT OFFICE 2,425,666

PROCESS OF POLYMERIZATION

Carl E. Barnes, Belvidere, N. J., assignor to General Aniline & Film Corporation, New York, N. Y., a corporation of Delaware No Drawing. Application February 3, 1945,
Serial No. 576,157

10 Claims. (Cl. 18—58)

This invention relates to an improved method for the polymerization of polymerizable organic compounds and is particularly concerned with a method of polymerization in which shrinkage during polymerization is prevented or corrected.

It is well known that the polymerization of most organic compounds, for instance, vinyl compounds, is accompanied by a contraction or shrinkage due to the fact that the density of the solid polymer is greater than that of the monomer. For many uses, this decrease in volume which accompanies the polymerization of vinyl compounds is disadvantageous. Thus, this shrinkage during polymerization seriously limits the usefulness of otherwise suitable polymerizable organic compounds in many "casting" type applications, since in order for the shape and markings of a mold to be reproduced satisfactorily, it is well known that a material which undergoes no change or even a slight expansion is desirable. However, the methods of polymerization which have heretofore been used by those skilled in the art do not correct for this volume change. In order to overcome and to compensate for this shrinkage, the art has largely relied on mechanical means. Thus, it has been heretofore proposed to use molds with movable walls which can follow the contracting mass during polymerization. Such devices, however, are limited in their application and, in many cases, are impractical. The shrinkage is also objectionable in many laminating operations since it often occurs to a greater extent in some regions than in others and thus gives rise to peculiarly shaped markings.

It is, therefore, an object of the present invention to provide a method for polymerization of polymerizable organic compounds in which the polymerization reaction, itself, is so controlled as to prevent the occurrence of or compensate for shrinkage during the polymerization. Other and further objects will be apparent as the present description progresses.

In practicing the present invention, the polymerization of a monomer of a polymerizable organic compound which is polymerizable over a reasonably wide temperature range, is initiated at a predetermined temperature at which the monomer is fluid. As the polymerization proceeds, the density of the material being polymerized, which will hereinafter be referred to as the "polymerizand," increases, and in order to prevent any shrinkage or decrease in volume, its temperature is increased so that the thermal expansion of the polymerizand, due to its increased temperature, substantially equals its shrinkage due to polymerization. While the temperature may be controlled throughout the entire course of polymerization, if desired, the temperature of the polymerizand need be controlled, so that any change in volume due to polymerization is substantially compensated for by an opposite change in volume due to thermal expansion, only during the final stages of polymerization when a form stable polymer is being formed. If desired, pressure may be applied to the material being polymerized while it is still fluid, in order to assure that the polymerizand contacts the surfaces of the mold. Either gas pressure or some mechanical means may be employed for applying pressure when it is desirable or necessary. The particular manner in which the temperature should be controlled may be determined by simple tests, as illustrated in the following specific example.

Example

A sample of methyl methacrylate previously polymerized by irradiating with ultra-violet light to a thick syrup (containing 18 g. polymer per 100 cc. of syrup) was cooled in a cylindrical Pyrex glass container, in the absence of air, to a temperature of −32° C. A mark was then made at the meniscus to mark the level of the liquid. It was then irradiated with a 125 watt, type 16200, Hanovia ultra-violet lamp at a distance of one foot. The temperature of the mass was controlled by circulating pure, colorless methanol, cooled by passing through a refrigerating solution, and adjusting the rate of flow by a thermostatically controlled circulating pump. The temperature was then manually raised by adjusting the thermostat at such a rate that the meniscus of the polymerizing mass was kept at the same point. The particular manner in which the temperature was controlled, in this experiment, in order to maintain the volume of the polymerizand constant, is given in the following table:

| Time, Hours | 0 | 5 | 5½ | 6 | 7 | 8 | 10 | 15 | 20 | 30 | 40 | 60 | 80 |
|---|---|---|---|---|---|---|---|---|---|---|---|---|---|
| Temp., °C | −32 | −28 | −22 | −18 | −14 | −12 | −8 | −2 | +3 | +10 | +15 | +20 | +22 |

This procedure described above is a convenient method of determining the particular conditions of temperature which should be employed during polymerization of any particular monomer in order to prevent shrinkage during polymerization or to cause a slight expansion.

Having determined the manner in which the temperature should be controlled for methyl methacrylate, a number of Pyrex glass molds were filled with methyl methacrylate from the same batch and were irradiated with ultra-violet light under similar conditions. During the polymerization, the temperature of the molds was controlled so as to correspond to that shown in the table. On completion of the polymerization, the polymerized articles were removed from the molds and it was found that the shape of the molds and all their markings had been accurately reproduced. The products were remarkably free from strains.

Other polymerizable compounds, which may be polymerized to form stable polymers over a sufficient temperature range and which have a sufficiently high co-efficient of thermal expansion or a sufficiently small shrinkage on polymerization, that the temperature during polymerization can be increased sufficiently so that the thermal expansion substantially equals the contraction or shrinkage due to polymerization, may be substituted for methyl methacrylate in the above example, the particular control of temperature, which is necessary for the specific monomer employed, being first determined as described above.

It will be apparent that in practicing the present invention, better results are obtained in the production of shaped articles if the monomer used is one which, during the intermediate stages of polymerization, has a syrupy or honey-like consistency, and does not form a gel. However, the results obtained in practicing the present invention, in the polymerization of monomers which form a gel during the early stages of polymerization, represent a substantial improvement over the prior art.

I have found that numerous vinyl compounds, such as, styrene and substituted styrene, such as monochloro-, or dichloro-styrene; for instance, -3,5 dichloro-styrene; vinyl acetate; N-vinyl pyrrole compounds such as vinyl carbazole; and numerous methacrylates, such as, allyl-, n-butyl-, iso-butyl-, cyclohexyl-, ethyl-, methyl-, α-methyl allyl-, β-methyl allyl-, N-propyl- and benzyl- methacrylates may be satisfactorily polymerized in accordance with the present invention. Mixtures of two or more vinyl compounds may also be used. While the process of the present invention is particularly valuable in the polymerization of vinyl compounds and cannot be so readily applied to some condensation type polymers, due to the formation of gases or vapors during the condensation, it will be apparent that its principle may be applied to the production of articles from cast phenol-, urea- or melamine-formaldehyde resins in which some water is formed during polymerization which is dissolved in the resin and slowly diffuses out.

The particular polymerization method employed should be one which allows the utilization of a wide temperature range. The use of ultra-violet light, employed in the above specific example, is therefore a preferred method since its use to initiate the polymerization permits the use of a wide temperature range. However, other methods, such as heat alone, or other catalysts, such as peroxides, ozonides, etc., may be employed, provided they are effective at the temperature employed. Combinations of ultra-violet light and peroxidic catalysts may also be employed with good results. It will be apparent to those skilled in the art that the particular polymerizable organic compound and the particular catalyst and many other details of the method of polymerization, aside from the control of temperature, which is employed do not per se form a part of the present invention. Since numerous specific methods of polymerization are known to those skilled in the art, and since the behavior of the polymerizable organic compounds, when treated in accordance with such polymerization methods, are also well known, those skilled in the art can readily determine the particular catalysts and other details of polymerization may be employed with any particular polymerizable organic compound in order for the polymerization to be conducted in accordance with the invention.

The particular temperature range which is employed should be so selected as to avoid any auto-catalytic reaction from setting in which results in the generation of heat at a rate faster than it can be dissipated through the mass. When the monomeric compound being polymerized has a sufficiently low freezing point, it is possible to initiate the polymerization at a low temperature, so that the elevated temperature required at the end of the polymerization to compensate for the polymerization shrinkage will approximate room temperature, thus avoiding any cooling of the finished article to room temperature and thereby avoiding thermal shrinkage of the finished product.

It will be apparent that the present invention is particularly advantageous in the production of shaped articles by the polymerization, in a stable form or mold, of a polymerizable organic compound which forms a hard rigid resin, since in this type of operation, not only is the shape of the mold accurately reproduced, but the creation of strains in the finished article is greatly reduced or eliminated. However, the invention is also applicable to the production of articles having properties resembling those of vulcanized rubber. While in such softer articles the formation of internal strains is less apt to be encountered or is less important, it is frequently desirable to accurately reproduce the marking of a mold.

I claim:

1. In the polymerization of polymerizable organic compounds which form a form stable resin on polymerization, the method of maintaining the volume of the material being polymerized substantially constant during polymerization, which comprises raising the temperature of the material being polymerized, during the course of polymerization and as it tends to become more dense, to cause the same to expand, and so regulating the increase in temperature at such a predetermined rate that the thermal expansion of the material being polymerized substantially compensates for the shrinkage of the same due to polymerization.

2. In the polymerization of polymerizable vinyl compounds which form a form stable resin on polymerization, the method of maintaining the volume of the material being polymerized substantially constant during polymerization, which comprises raising the temperature of the material being polymerized during the course of polymerization and, as it tends to become more dense, to cause the same to expand, and so regulating the increase in temperature at such a predetermined rate that the thermal expansion of the material being polymerized substantially compensates for the shrinkage of the same due to polymerization.

3. In the polymerization of polymerizable methacrylic esters which form a form stable resin on polymerization, the method of maintaining the volume of the material being polymerized substantially constant during polymerization, which comprises raising the temperature of the material being polymerized during the course of polymerization and, as it tends to become more dense, to cause the same to expand, and so regulating the increase in temperature at such a predetermined rate that the thermal expansion of the material being polymerized substantially compensates for the shrinkage of the same due to polymerization.

4. In the polymerization of polymerizable N-vinyl pyrrole compounds which form a form stable resin on polymerization, the method of maintaining the volume of the material being polymerized substantially constant during the polymerization, which comprises raising the temperature of the material being polymerized during the course of polymerization and, as it tends to become more dense, to cause the same to expand, and so regulating the increase in temperature at such a predetermined rate that the thermal expansion of the material being polymerized substantially compensates for the shrinkage of the same due to polymerization.

5. In the polymerization of polymerizable phenyl ethylene compounds which form a hard resin on polymerization, the method of maintaining the volume of the material being polymerized substantially constant during polymerization, which comprises raising the temperature of the material being polymerized during the course of polymerization and, as it tends to become more dense, to cause the same to expand, and so regulating the increase in temperature at such a predetermined rate that the thermal expansion of the material being polymerized substantially compensates for the shrinkage of the same due to polymerization.

6. In the production of shaped articles by the polymerization, in a rigid mold, of polymerizable organic compounds which form a hard resin on polymerization, the method of maintaining the volume of the material being polymerized substantially constant during polymerization, which comprises raising the temperature of the material being polymerized during the course of polymerization and, as it tends to become more dense, to cause the same to expand, and so regulating the increase in temperature at such a predetermined rate that the thermal expansion of the material being polymerized slightly exceeds the shrinkage of the same due to polymerization.

7. In the production of shaped articles by the polymerization, in a rigid mold, of polymerizable vinyl compounds which form a hard resin on polymerization, the method of maintaining the volume of the material being polymerized substantially constant during polymerization, which comprises raising the temperature of the material being polymerized during the course of polymerization and, as it tends to become more dense, to cause the same to expand, and so regulating the increase in temperature at such a predetermined rate that the thermal expansion of the material being polymerized slightly exceeds the shrinkage of the same due to polymerization.

8. In the production of shaped articles by the polymerization, in a rigid mold, of polymerizable methacrylic esters which form a hard resin on polymerization, the method of maintaining the volume of the material being polymerized substantially constant during polymerization, which comprises raising the temperature of the material being polymerized during the course of polymerization and, as it tends to become more dense, to cause the same to expand, and so regulating the increase in temperature at such a predetermined rate that the thermal expansion of the material being polymerized slightly exceeds the shrinkage of the same due to polymerization.

9. In the production of shaped articles by the polymerization, in a rigid mold, of polymerizable N-vinyl pyrrole compounds which form a hard resin on polymerization, the method of maintaining the volume of the material being polymerized substantially constant during polymerization, which comprises raising the temperature of the material being polymerized during the course of polymerization and, as it tends to become more dense, to cause the same to expand, and so regulating the increase in temperature at such a predetermined rate that the thermal expansion of the material being polymerized slightly exceeds the shrinkage of the same due to polymerization.

10. In the production of shaped articles by the polymerization, in a rigid mold, of polymerizable styrene compounds which form a hard resin on polymerization, the method of maintaining the volume of the material being polymerized substantially constant during polymerization, which comprises raising the temperature of the material being polymerized during the course of polymerization and, as it tends to become more dense, to cause the same to expand, and so regulating the increase in temperature at such a predetermined rate that the thermal expansion of the material being polymerized slightly exceeds the shrinkage of the same due to polymerization.

CARL E. BARNES.

REFERENCES CITED

The following references are of record in the file of this patent:

UNITED STATES PATENTS

| Number | Name | Date |
|---|---|---|
| 2,400,094 | Benning et al. | May 14, 1946 |

OTHER REFERENCES

India Rubber World, Nov. 1942, page 172.
Handbook of Chemistry and Physics, 28th ed., Chemical Rubber Publishing Co., Cleveland, Ohio, 1944, pages 1675–1685.